UNITED STATES PATENT OFFICE.

ELLEF PETERSEN AND MARY CLAIREMONT, OF SANTA BARBARA, CALIFORNIA.

PRESERVING COMPOUND FOR EGGS.

999,589.  Specification of Letters Patent.  Patented Aug. 1, 1911.

No Drawing.  Application filed November 15, 1910. Serial No. 592,589.

*To all whom it may concern:*

Be it known that we, ELLEF PETERSEN and MARY CLAIREMONT, both citizens of the United States, and residing at Santa Barbara, in the county of Santa Barbara and State of California, have invented certain new and useful Improvements in Preserving Compounds for Eggs, of which the following is a specification.

The present invention relates to preservatives and more particularly to a compound for preserving eggs in their natural state, and thus avoiding the disadvantages and danger attending the keeping of eggs by cold storage.

Summarily stated, the invention consists in coating the shells of the eggs with a compound in solution to effectively exclude the air and in accomplishing which, the eggs retain their natural freshness without change of color, taste, nutrition, or in any manner causing deterioration of the shell contents.

With this object in view, the invention consists in a composition or compound of matter formed with the following ingredients in or about the proportions specified, to wit:—The juice of cactus is mixed with the oil of cotton seed in the proportions of one-third part of the former to two-thirds part of the latter and the mixture heated to the boiling point and then allowed to cool to 100° F. The eggs to be preserved are then submerged in this solution and allowed to remain therein for a period of twenty-four consecutive hours, at the end of which time they are taken out and allowed to drain until such time as they have become thoroughly dry. The eggs are then packed in crates or otherwise stored after the usual manner.

The preservative qualities of this solution are not found solely in the oil, although that is necessary, but the cactus juice being a gummy or sticky substance materially assists, and in fact makes possible the preserving of the egg. It acts as an air excluding compound and forms a coating over the pores of the eggs in conjunction with the cotton seed oil, which greatly adds to its sealing properties. It also has other properties, thus it greatly assists the drying properties of the cotton seed oil, and tends to soften the lime of the egg shell and hermetically seal the same.

It has been found, after extended experiments, that far more successful results have been obtained by the use of the cactus juice than without it. In fact, the discovery is successful only by the use of the cactus juice, obtained by boiling down the cactus plant and using the product in solution with the oil of cotton seed as above described. The preservative qualities do not depend upon the oil alone, but as much on the cactus juice; the combination between them producing the successful result.

As a substitute for the oil of cotton seed, it has been found that olive oil, and also milk, may be used with equally as good results. When used with milk, the proportions are one-third cactus juice and two-thirds milk. It is possible also to use as the oil element of the solution, cotton-seed oil, olive oil and milk combined.

From the foregoing, it will be readily seen that each egg is covered with a hermetically sealed outer shell, which will effectively seal all of the pores of the shell and protect the contents thereof from the contaminating influences of the atmosphere.

We claim:—

1. A preserving compound comprising a liquid containing oil, and the juice of cactaceæ.

2. A preserving compound comprising the oil of cotton-seed, and the juice of cactus plant.

3. A preserving compound consisting of oil of cotton-seed, milk, and the juice of cactus plant.

The foregoing specification signed at Santa Barbara, California this 28th day of September, 1910.

ELLEF PETERSEN.
MARY CLAIREMONT.

In presence of—
 VICTOR CLAIREMONT,
 L. H. ROSEBERRY.